(12) United States Patent
Choi

(10) Patent No.: US 12,089,263 B2
(45) Date of Patent: Sep. 10, 2024

(54) APPARATUS AND METHOD FOR TRANSMITTING RADIO ACCESS NETWORK SLICING-RELATED INFORMATION

(71) Applicant: UUCOM CO., LTD, Gyeonggi-do (KR)

(72) Inventor: Su Han Choi, Gwacheon-si (KR)

(73) Assignee: UUCOM CO., LTD., Gwacheon (KR)

( * ) Notice: Subject to any disclaimer, the term of this patent is extended or adjusted under 35 U.S.C. 154(b) by 0 days.

(21) Appl. No.: 18/019,030

(22) PCT Filed: Jul. 28, 2021

(86) PCT No.: PCT/KR2021/009766
§ 371 (c)(1),
(2) Date: Jan. 31, 2023

(87) PCT Pub. No.: WO2022/025610
PCT Pub. Date: Feb. 3, 2022

(65) Prior Publication Data
US 2023/0292368 A1    Sep. 14, 2023

(30) Foreign Application Priority Data

Jul. 31, 2020 (KR) .......................... 10-2020-0095727
Jul. 23, 2021 (KR) .......................... 10-2021-0097195

(51) Int. Cl.
*H04W 74/0833* (2024.01)
*H04W 36/06* (2009.01)
*H04W 74/00* (2009.01)

(52) U.S. Cl.
CPC ....... *H04W 74/0833* (2013.01); *H04W 36/06* (2013.01); *H04W 74/006* (2013.01)

(58) Field of Classification Search
None
See application file for complete search history.

(56) References Cited

U.S. PATENT DOCUMENTS

| | | |
|---|---|---|
| 2017/0367120 A1 | 12/2017 | Murray et al. |
| 2018/0317264 A1* | 11/2018 | Agiwal ................. H04W 52/36 |
| 2019/0104551 A1 | 4/2019 | Deenoo et al. |
| 2019/0174561 A1 | 6/2019 | Sivavakeesar |

(Continued)

FOREIGN PATENT DOCUMENTS

| | | | | |
|---|---|---|---|---|
| EP | 4135465 A1 * | 2/2023 | ............ | H04W 48/18 |
| JP | 2019-525651 | 9/2019 | | |

(Continued)

OTHER PUBLICATIONS

ZTE, Consideration on RAN Side Network Slicing, R3-160821, 3GPP TSG RAN WG3 Meeting #91bis, Bangalore, India, Apr. 2016.

(Continued)

*Primary Examiner* — Hong S Cho
(74) *Attorney, Agent, or Firm* — Insight Law Group, PLLC; Seung Lee

(57) ABSTRACT

The present disclosure relates to an apparatus and method for transmitting RAN (Radio Access Network) slice-related information, and discloses a user equipment including: a transceiver configured to receive individual control information provided individually for each RAN slice from a network node, and to perform a random access procedure using resources individually configured for each RAN slice based on the individual control information; and a processor for controlling reception of the individual control information, and the random access procedure. Such a user equipment provides an effect of being able to separately transmit control information including, for example, system information for each slice for RAN slicing.

20 Claims, 8 Drawing Sheets

(56) References Cited

U.S. PATENT DOCUMENTS

| | | |
|---|---|---|
| 2019/0289534 A1 | 9/2019 | Ryoo et al. |
| 2021/0227558 A1* | 7/2021 | Matsumura ............. H04L 5/001 |
| 2021/0352575 A1* | 11/2021 | Chun ................ H04W 74/0833 |
| 2023/0017114 A1* | 1/2023 | Wen .................. H04W 74/0833 |

FOREIGN PATENT DOCUMENTS

| | | |
|---|---|---|
| KR | 10-2017-0128043 | 11/2017 |
| KR | 10-2019-0018170 | 2/2019 |
| KR | 10-2019-0073383 | 6/2019 |
| KR | 10-2019-0131160 | 11/2019 |
| KR | 10-2020-0049736 | 5/2020 |

OTHER PUBLICATIONS

International Search Report for International Application No. PCT/KR2021/009766, dated Oct. 27, 2021.

Xiaomi, "PRACH partitioning, access and congestion control Consideration for Network Slicing", R2-1700998, 3GPP TSG-RAN WG2 #97, Athens, Greece, Feb. 2017.

InterDigital Inc., "RACH Configuration for NR", R2-1706685, 3GPP TSG-RAN WG2#NR AdHoc#2, Qingdao, China, Jun. 2017.

CMCC: "Motivation for new SI: Study on enhancement of RAN slicing", 3GPP Draft; RP-192601, 3rd Generation Partnership Project (3GPP), Mobile Competence Centre ; 650, Route Des Lucioles; F-06921 Sophiaantipolis Cedex; France, TSG RAN, Sitges, Barcelona; Dec. 9, 2019-Dec. 12, 2019 Dec. 2, 2019 (Dec. 2, 2019), XP051834251.

CMCC: "Second round email discussion for R17 proposals on slicing", 3GPP Draft; RP-192599, 3rd Generation Partnership Project (3GPP), Mobile Competence Centre; 650, Route Des Lucioles ; F-06921 Sophia-Antipolis Cedex; France, TSG RAN, Sitges, Barcelona; Dec. 9, 2019-Dec. 12, 2019 Dec. 2, 2019 (Dec. 2, 2019), XP051834249.

Extended European Search Report mailed on Jul. 1, 2024 from the European Patent Office for European Application No. 21851318.2.

* cited by examiner

[FIG. 1]
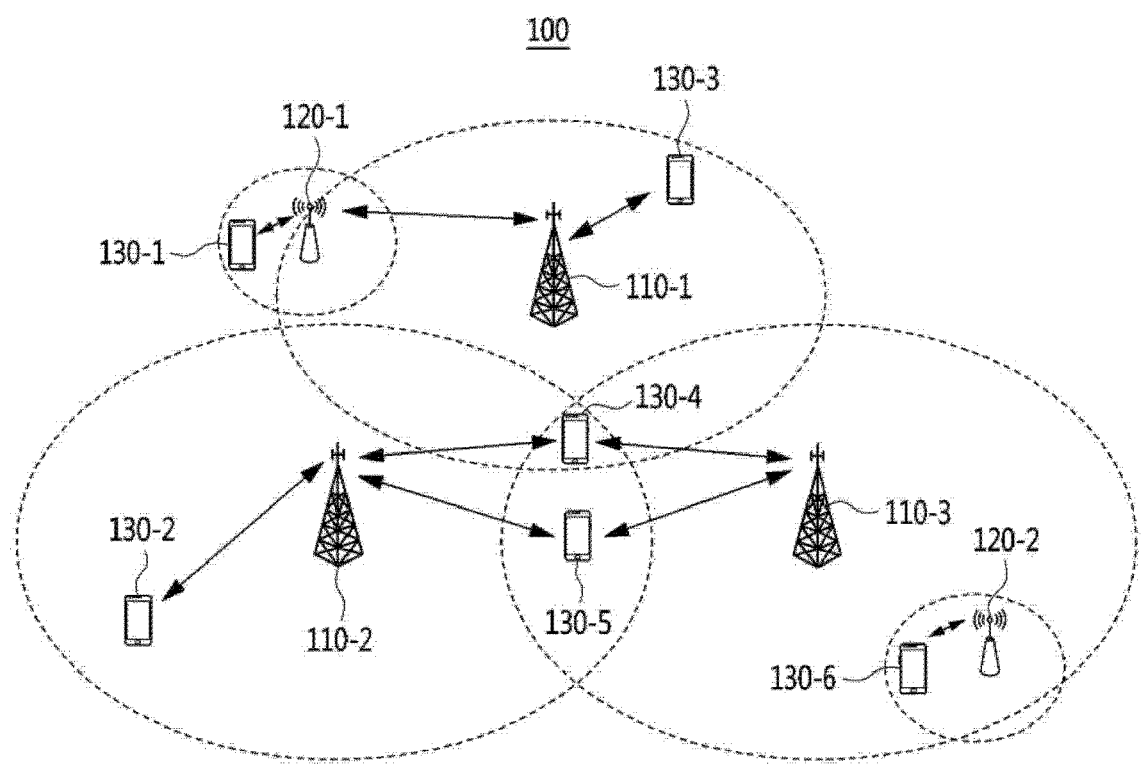

[FIG. 2]
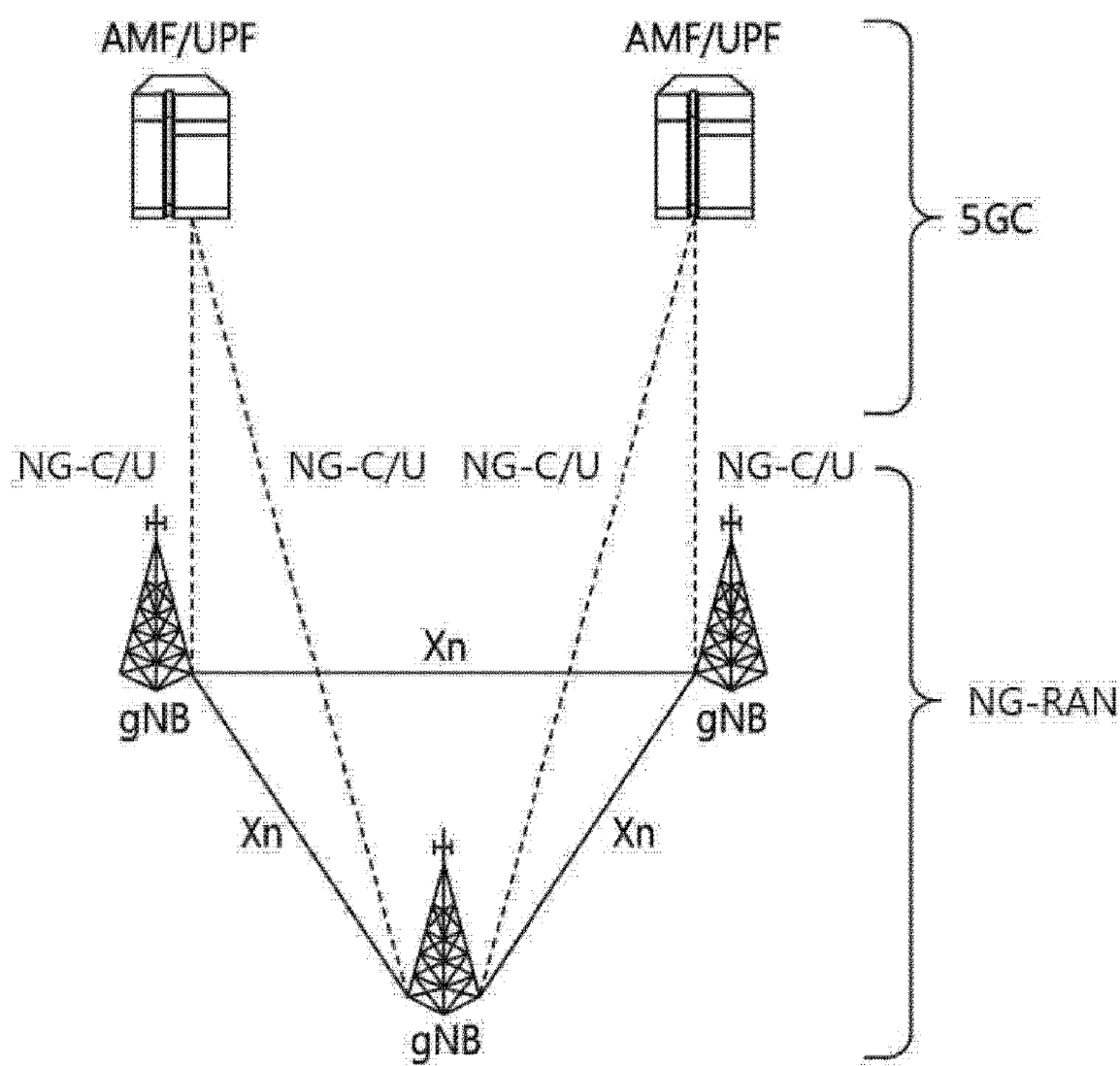

[FIG. 3]
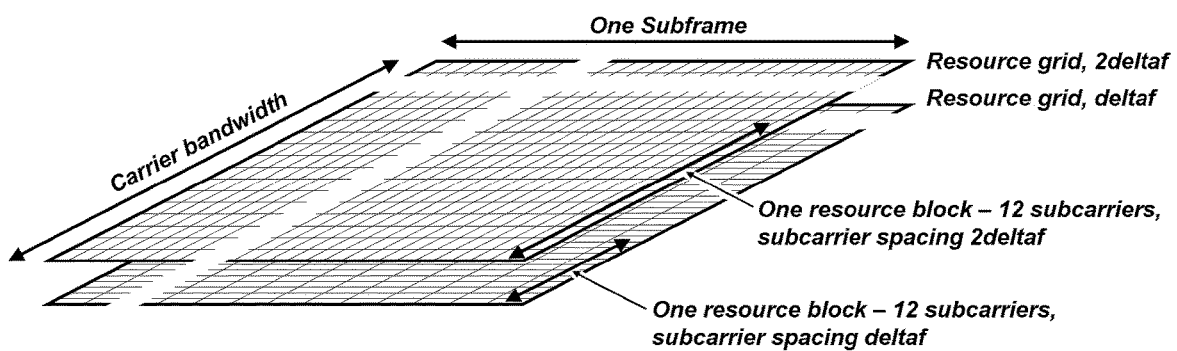

[FIG. 4]
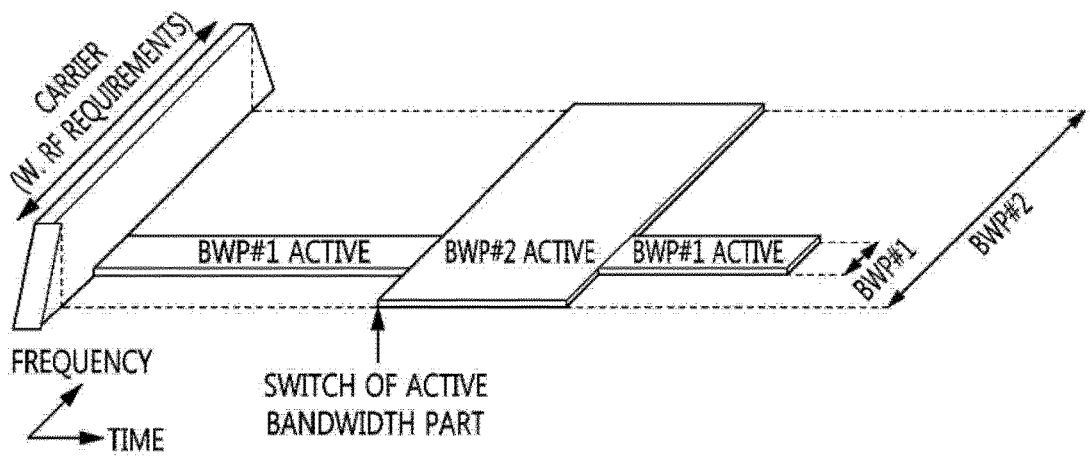

[FIG. 5]
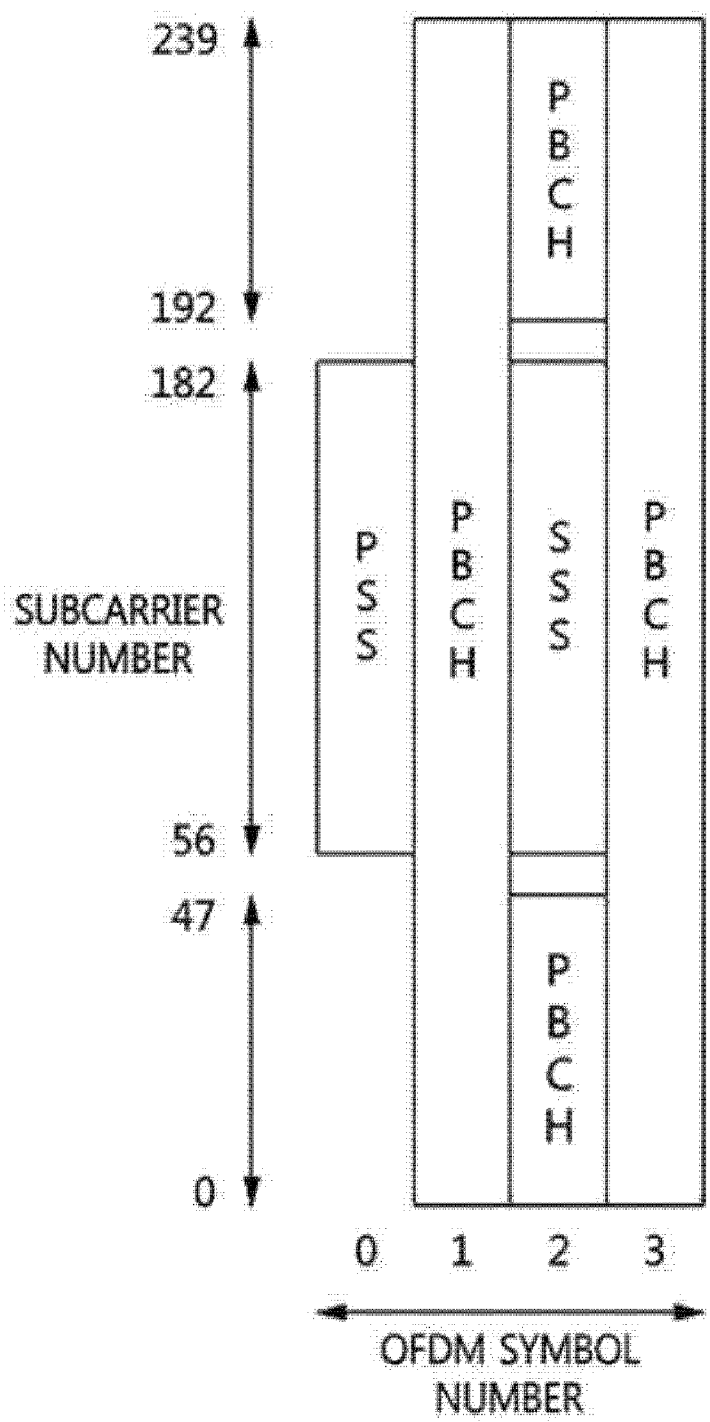

[FIG. 6]
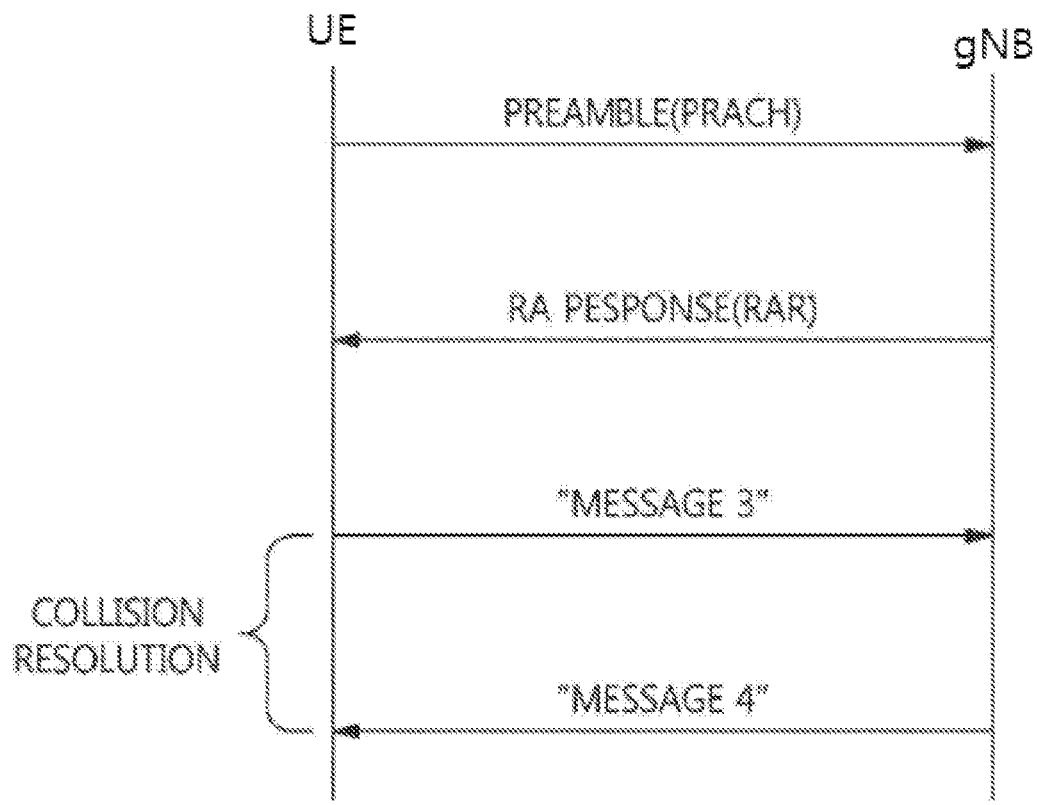

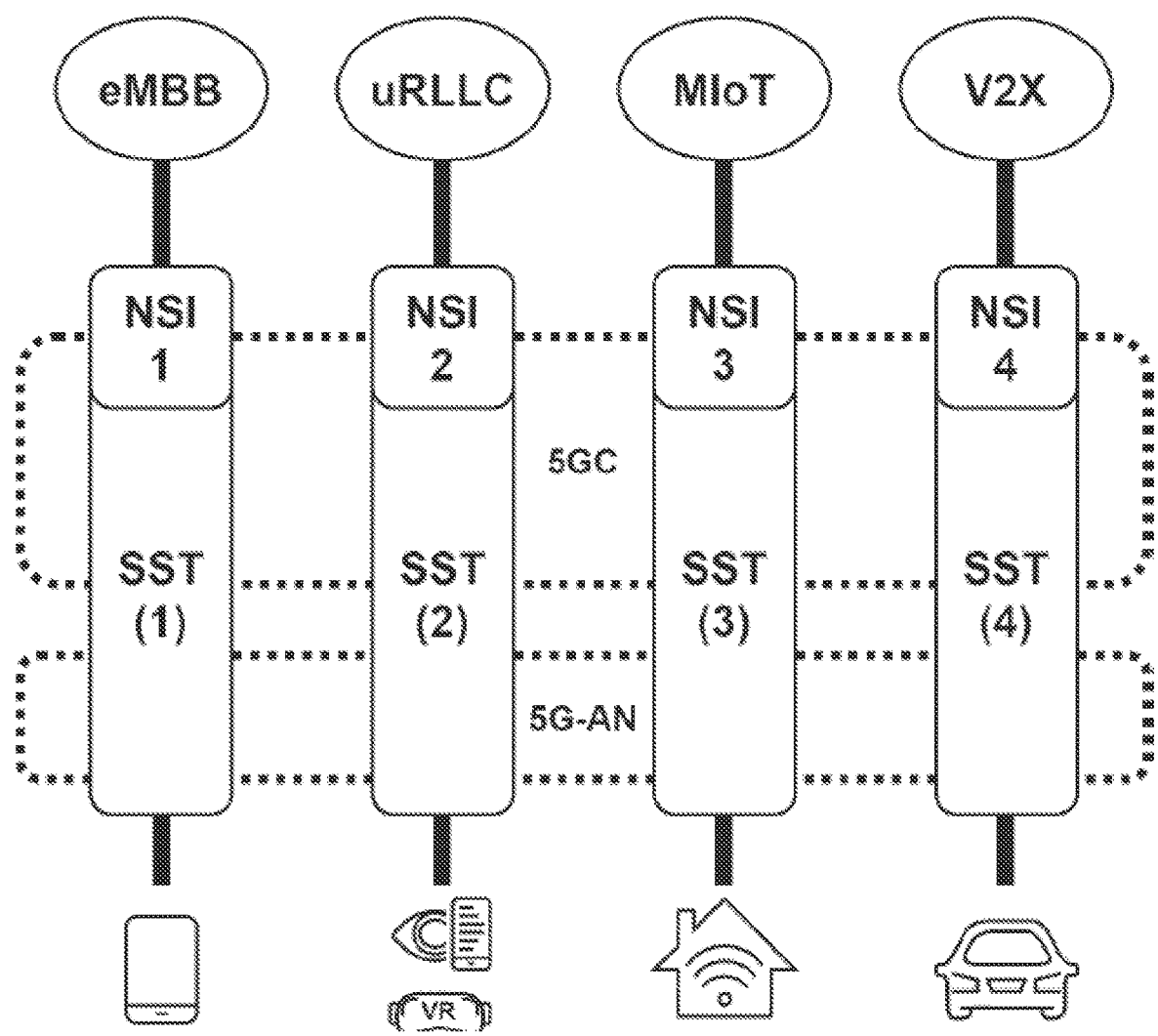
[FIG. 7]

[FIG. 8]
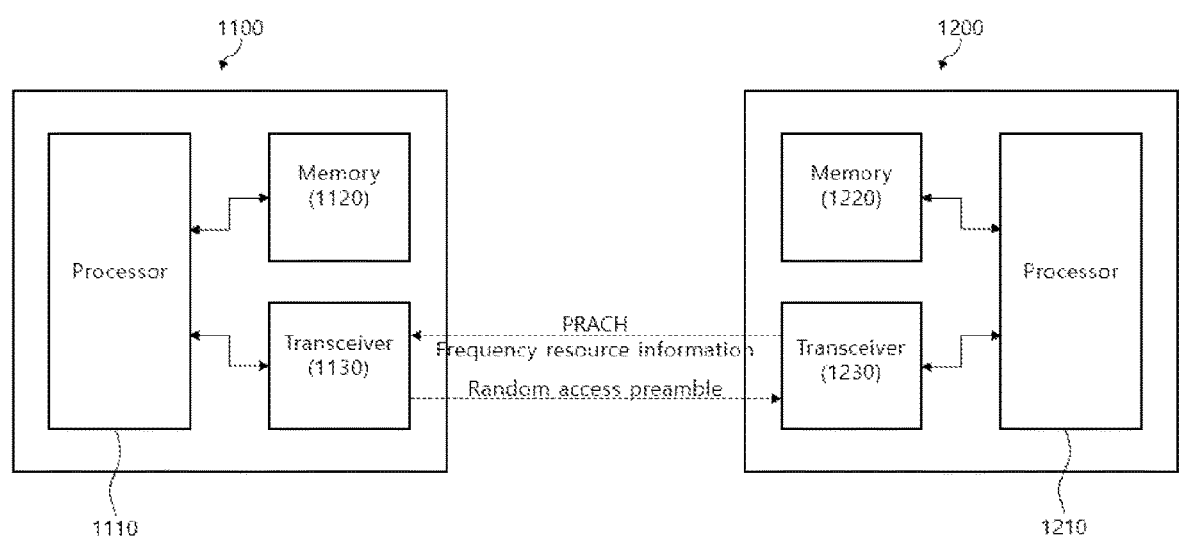

APPARATUS AND METHOD FOR TRANSMITTING RADIO ACCESS NETWORK SLICING-RELATED INFORMATION

FIELD OF THE DISCLOSURE

The present disclosure relates to a wireless communication system, and more particularly, to an apparatus and a method for transmitting RAN (Radio Access Network) slicing-related information.

RELATED ART

3GPP opened the way for commercial applications of 5G by finalizing the first global 5G New Radio (NR) standard in Release (Rel)-15. 5G NR is a radio access technology that can provide improved data rates compared to LTE E-UTRA (Evolved UMTS Terrestrial Radio Access) and satisfy various QoS requirements for each segmented and specified usage scenario. In particular, eMBB (enhancement Mobile BroadBand), mMTC (massive Machine-Type Communications), and URLLC (Ultra Reliable and Low Latency Communications) have been defined as representative usage scenarios of 5G. As a method for satisfying the requirements for each scenario, flexible numerology compared to LTE is provided.

In addition, network slicing technology is being considered. The network slicing technology is a new concept applied to 5G mobile communication in which network resources and network functions are provided by rendering end-to-end (E2E) resources from radio access network (RAN) to core network (CN) as one independent slice for each service, and attributes such as network isolation, customization, and independent management and orchestration can be applied to the radio access network and core network of mobile communication.

Communication technology is evolving in a way that constitutes a network slice optimized for each application's characteristics in one huge network in conjunction with the development of technologies such as network function virtualization (NFV), software defined network (SDN), and the like.

The network slice physically creates a logically separated E2E network which includes a user equipment, radio access, transport, and 5G core equipment. Through that slice, one can provide a dedicated network specialized for each of various services having different characteristics and quality of service (QoS). That is, the network slice is a technology that provides network resources and network functions required for a service requested by a user equipment as one independent slice.

SUMMARY

An object of the present disclosure is to provide an apparatus and method for transmitting RAN slicing-related information. In order to efficiently support various services in 5G mobile communication, that is, to support multiple services with one system without having separate systems for each of the various services, it is necessary to dynamically control resources through slicing. However, RAN slicing has a greater difficulty than slicing for core network. In the RAN slicing concept, it is required that each slice can operate like an independent cell, and is isolated from the other slices to be able to operate independently, so even in an operation failure state of one slice, the other slices are not affected. Therefore, a method for separately transmitting information for each RAN slice is required.

A user equipment, which operates in a communication system supporting RAN (Radio Access Network) slice information, according to one aspect of the present disclosure, may includes: a transceiver configured with the individual control information provided individually for each RAN slice from a network node, and to perform a random access procedure using resources individually configured for each RAN slice based on the individual control information; and a processor for controlling reception of the individual control information, and the random access procedure.

The individual control information may be system information, the system information may include at least one of first control information for a slice of a first type and second control information for a slice of a second type, and the processor may be configured to control a random access procedure in the slice of the first type based on the first control information and to control a random access procedure in the slice of the second type based on the second control information.

Each of the first control information and the second control information may include at least one of random access parameter information, random access resource information, initial bandwidth information, TDD (Time Division Duplex) setting information, slice resource information on frequency, slice resource information on time, CORESET 0 (Control Resource Set 0), search space, basic SCS (SubCarrier Spacing) per slice, BWP (BandWidth Part), serving cell SIBs (System Information Blocks), and RACH (Random Access Channel) information.

The system information may further include an information value indicating whether the network node supports RAN slice operation or not.

The first control information and the second control information may be configured so that components thereof are different from each other, or one or more of values of components thereof are different from each other.

The system information may further include identification information of each slice, and the processor may be configured to extract the first control information based on a first identification code corresponding to the slice of the first type, and to extract the second control information based on a second identification code corresponding to the slice of the second type.

The system information may include reception control information for controlling reception of at least one of the first control information and the second control information, and the processor may be configured to control reception of at least one of the first control information and the second control information based on the reception control information.

The reception control information may include first reception control information corresponding to the slice of the first type and second reception control information corresponding to the slice of the second type.

The reception control information may include at least one of information on location of the first DM-RS (DeModulation Reference Signal) symbol on frequency or spatial domain, SIB1 numerology information, CORESET-related information for SIB1 scheduling, search space information, and parameter information related to PDCCH (Physical Downlink Control Channel).

The processor may be configured to control communication based on the default control information and the default configuration resources when the first control information is unavailable even though the processor intends to control communication in the slice of the first type, or when the second control information is unavailable even though the processor intends to control communication in the slice of the second type.

A network node, which operates in a communication system supporting RAN (Radio Access Network) slice information, according to one aspect of the present disclosure, may include: a transceiver configured to transmit individual control information provided individually for each RAN slice to a user equipment, and to provide a random access procedure using resources individually configured for each RAN slice based on the individual control information; and a processor for controlling transmission and reception of the individual control information, and the random access procedure.

The individual control information may be system information, the system information may include at least one of first control information for a slice of a first type and second control information for a slice of a second type, and the processor may be configured to control a random access procedure in the slice of the first type based on the first control information and to control a random access procedure in the slice of the second type based on the second control information.

Each of the first control information and the second control information may include at least one of random access parameter information, random access resource information, initial bandwidth information, TDD (Time Division Duplex) setting information, slice resource information on frequency, slice resource information on time, CORESET 0 (Control Resource Set 0), search space, basic SCS (SubCarrier Spacing) per slice, BWP (BandWidth Part), SIBs (System Information Blocks) for serving cell, and RACH (Random Access Channel) information.

The first control information and the second control information may be configured so that components thereof are different from each other, or one or more of values of components thereof are different from each other.

The system information may further include identification information of each slice, and the processor may be configured to include first control information in the system information based on a first identification code corresponding to the slice of the first type, and to include second control information in the system information based on a second identification code corresponding to the slice of the second type.

The system information may include reception control information for controlling reception of at least one of the first control information and the second control information.

The reception control information may include first reception control information corresponding to the slice of the first type and second reception control information corresponding to the slice of the second type.

The reception control information may include at least one of information on location of the first DM-RS (De-Modulation Reference Signal) symbol on frequency or spatial domain, SIB1 numerology information, CORESET-related information for SIB1 scheduling, search space information, and parameter information related to PDCCH (Physical Downlink Control Channel).

The processor may generate a handover message to be transmitted to the user equipment when the user equipment needs to be handed over to another network node, include at least one of first handover information for the slice of the first type and second handover information for the slice of the second type in the handover message when the another network node supports RAN slice-based communication, and include basic handover information for the another network node in the handover message when the another network node does not support RAN slice-based communication, and the transceiver may be configured to transmit the handover message to the user equipment.

A method for performing communication using a user equipment in a communication system supporting RAN (Radio Access Network) slice information, according to one aspect of the present disclosure, may include: receiving individual control information provided individually for each RAN slice from a network node, and performing a random access procedure using resources individually configured for each RAN slice based on the individual control information, wherein the individual control information may be system information, the system information may include at least one of first control information and second control information, and a random access procedure in a slice of a first type may be controlled based on the first control information, and a random access procedure in a slice of a second type may be controlled based on the second control information.

According to the apparatus and method of the present disclosure, for RAN slicing, control information including, for example, system information can be separated and transmitted for each slice. According to one aspect, a unique ID can be designated for each slice (e.g., eMBB, URLLC, V2X slice, etc.), and different services or slices can be distinguished from each other by each slice ID. For example, in transmitting system information allocated for each slice, information can be transmitted based on the slice ID as described above.

BRIEF DESCRIPTION OF THE DRAWINGS

FIG. 1 is a conceptual diagram showing a wireless communication system according to one embodiment of the present disclosure.

FIG. 2 is an exemplary diagram showing a NR system to which a data transmission method according to one embodiment of the present disclosure can be applied.

FIG. 3 is a diagram for explaining a resource grid supported by a radio access technology to which the embodiment of the present disclosure can be applied.

FIG. 4 is a diagram for explaining a bandwidth part (BWP) supported by the radio access technology to which the embodiment of the present disclosure can be applied.

FIG. 5 is a diagram illustrating a synchronization signal block (SSB) in the radio access technology to which the embodiment of the present disclosure can be applied.

FIG. 6 is a diagram for explaining a random access procedure in the radio access technology to which the embodiment of the present disclosure can be applied.

FIG. 7 is a diagram for explaining the concept of a network slice according to one embodiment.

FIG. 8 shows a user equipment and a network node in which one embodiment of the present disclosure is implemented

DESCRIPTION OF EXEMPLARY EMBODIMENTS

The present disclosure may be changed in various ways and may have various embodiments, and specific embodiments are illustrated in the drawings and described in detail in the detailed description. However, it should be understood that the present disclosure is not intended to be limited to the specific embodiments and that the present disclosure includes all changes, equivalents and substitutions which fall within the spirit and technological scope of the present disclosure. Similar reference numerals are given to similar components in the descriptions with reference to the drawings.

In this specification, terms, such as a "first", a "second", "A", and "B", may be used to describe various components, but the components should not be restricted by the terms. The terms are used to only distinguish one component from another component. For example, a first element may be named a second element without departing from the scope of the present disclosure, or vice versa. The term "and/or" includes a combination of a plurality of related items or any one of the plurality of related items.

When it is described that one element is "connected" or "coupled" to another element, it should be understood that one element may be connected or coupled to another element directly or through a third element that exists therebetween. In contrast, when it is described that one element is "directly connected" or "directly coupled" to another element, it should be understood that no third element exists therebetween.

The terms in this specification are used to only describe specific embodiments and are not intended to limit the present disclosure. singular expressions should be construed as including plural expressions unless clearly defined otherwise in the context. It is to be understood that in this specification, a term, such as "include (or comprise)" or "have", is intended to indicate that characteristics, numbers, steps, operations, elements, parts, or a combination thereof which are described in the specification are present and does not exclude the existence or possible addition of one or more other characteristics, numbers, steps, operations, elements, parts, or a combination thereof in advance.

The terms used in this specification, including technical terms or scientific terms, have the same meanings as those commonly understood by a person having ordinary skill in the art to which the present disclosure pertains unless otherwise defined. The terms, such as those commonly used and defined in dictionaries, should be construed as having the same meanings as those in the context of a related technology, and should not be construed as having ideal or excessively formal meanings unless explicitly defined in this specification.

Hereinafter, preferred embodiments according to the present disclosure will be described in detail with reference to the accompanying drawings.

FIG. 1 is a conceptual diagram illustrating a wireless communication system according to one embodiment of the present disclosure.

Referring to FIG. 1, the wireless communication system 100 may be configured with a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA)-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, an orthogonal frequency division multiple access (OFDMA)-based communication protocol, a single carrier (SC)-FDMA-based communication protocol, a non-orthogonal multiple access (NOMA)-based communication protocol, a space division multiple access (SDMA)-based communication protocol, etc.

The wireless communication system 100 may include a plurality of base stations 110-1, 110-2, 110-3, 120-1, and 120-2, and a plurality of user equipments 130-1, 130-2, 130-3, 130-4, 130-5, and 130-6.

Each of the fourth base station 120-1 and the fifth base station 120-2 may form a small cell. The fourth base station 120-1, the third user equipment 130-3 and the fourth user equipment 130-4 may belong to coverage of the first base station 110-1. The second user equipment 130-2, the fourth user equipment 130-4 and the fifth user equipment 130-5 may belong to coverage of the second base station 110-2. The fifth base station 120-2, the fourth user equipment 130-4, the fifth user equipment 130-5 and the sixth user equipment 130-6 may belong to coverage of the third base station 110-3. The first user equipment 130-1 may belong to coverage of the fourth base station 120-1. The sixth user equipment 130-6 may belong to coverage of the fifth base station 120-2.

In this case, each of the plurality of base stations 110-1, 110-2, 110-3, 120-1, and 120-2 may be denoted as a nodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, etc. Each of the plurality of the user equipments 130-1, 130-2, 130-3, 130-4, 130-5, and 130-6 may be denoted as a terminal, an access terminal, a mobile terminal, a station, a subscriber station, a mobile station, a portable subscriber station, a node, a device, etc.

Each of the plurality of communication nodes 110-1, 110-2, 110-3, 120-1, 120-2, 130-1, 130-2, 130-3, 130-4, 130-5, and 130-6 may support the cellular communication (e.g., long term evolution (LTE), LTE-advanced (LTE-A), a new radio (NR), etc. which are regulated in 3rd generation partnership project (3GPP) standard). The plurality of base stations 110-1, 110-2, 110-3, 120-1, and 120-2 may operate in different frequency bands or in the same frequency band. The plurality of base stations 110-1, 110-2, 110-3, 120-1, and 120-2 may be connected through an ideal backhaul or a non-ideal backhaul, and may exchange information through the ideal backhaul or the non-ideal backhaul. The plurality of base stations 110-1, 110-2, 110-3, 120-1, and 120-2 may be connected to a core network (not shown) through the ideal backhaul or the non-ideal backhaul. Each of the plurality of base stations 110-1, 110-2, 110-3, 120-1, and 120-2 may transmit a signal, received from the core network, to a corresponding user equipment 130-1, 130-2, 130-3, 130-4, 130-5, or 130-6, and may transmit, to the core network, a signal received from the corresponding user equipment 130-1, 130-2, 130-3, 130-4, 130-5, or 130-6.

Each of the plurality of base stations 110-1, 110-2, 110-3, 120-1, and 120-2 may support OFDMA-based downlink transmission, and may support OFDMA-based or SC-FDMA-based uplink transmission. Furthermore, each of the plurality of base stations 110-1, 110-2, 110-3, 120-1, and 120-2 may support multiple input multiple output (MIMO) transmission (e.g., single user (SU)-MIMO, multi user (MU)-MIMO, massive MIMO, etc.), coordinated multipoint transmission (COMP), carrier aggregation transmission, transmission in an unlicensed band, device to device (D2D) communication (or proximity services (ProSe)), etc. In this case, each of the plurality of the user equipments 130-1, 130-2, 130-3, 130-4, 130-5, and 130-6 may perform an operation corresponding to the base station 110-1, 110-2, 110-3, 120-1, or 120-2 and/or an operation supported by the base station 110-1, 110-2, 110-3, 120-1, or 120-2.

For example, the second base station 110-2 may transmit a signal to the fourth user equipment 130-4 based on the SU-MIMO method. The fourth user equipment 130-4 may receive a signal from the second base station 110-2 based on the SU-MIMO method. Alternatively, the second base station 110-2 may transmit a signal to the fourth user equipment 130-4 and the fifth user equipment 130-5 based on the MU-MIMO method, and each of the fourth user equipment 130-4 and the fifth user equipment 130-5 may receive a signal from the second base station 110-2 based on the MU-MIMO method. Each of the first base station 110-1, the second base station 110-2 and the third base station 110-3 may transmit a signal to the fourth user equipment 130-4 based on the CoMP method, and the fourth user equipment 130-4 may receive a signal from the first base station 110-1, the second base station 110-2 and the third base station 110-3 based on the CoMP method. Each of the plurality of base stations 110-1, 110-2, 110-3, 120-1, and 120-2 may transmit and receive signals to and from the user equipments 130-1, 130-2, 130-3, 130-4, 130-5, and 130-6, belonging to its own coverage, based on the CA method.

Each of the first base station 110-1, the second base station 110-2 and the third base station 110-3 may coordinate D2D communication between the fourth user equipment 130-4 and the fifth user equipment 130-5. The fourth user equipment 130-4 and the fifth user equipment 130-5 may perform D2D communication through the coordination of the second base station 110-2 and the third base station 110-3, respectively.

Hereinafter, when a method (e.g., the transmission or reception of a signal) performed by a first communication node of communication nodes is described, a second communication node corresponding to the first communication node may perform a method (e.g., the reception or transmission of a signal) corresponding to the method performed by the first communication node. That is, when an operation of the user equipment is described, the base station corresponding to the user equipment may perform an operation corresponding to the operation of the user equipment. In contrast, when an operation of the base station is described, the user equipment corresponding to the base station may perform an operation corresponding to the operation of the base station.

Furthermore, hereinafter, downlink (DL) means communication from the base station to the user equipment. Uplink (UL) means communication from the user equipment to the base station. In the downlink, a transmitter may be a part of the base station, and a receiver may be a part of the user equipment. In the uplink, the transmitter may be a part of the user equipment, and the receiver may be a part of the base station.

Recently, as the supply of user equipments for smartphones and Internet of Things (IoT) is rapidly spread, the amount of information exchanged through the communication network is increased. Accordingly, in a next-generation radio access technology, an environment (e.g., enhanced mobile broadband communication) in which faster services are provided to more users, compared to the existing communication system (or existing radio access technology), needs to be considered. To this end, the design of a communication system which considers machine type communication (MCT) for providing services by connecting multiple devices and objects is discussed. Furthermore, the design of a communication system (e.g., ultra-reliable and low latency communication (URLLC)) which considers a service and/or a terminal sensitive to the reliability and/or latency of communication is also discussed.

Hereinafter, in this specification, for convenience of description, the next-generation radio access technology is denoted as a new radio access technology (RAT). A wireless communication system to which the new RAT is applied is denoted as a new radio (NR) system. In this specification, a frequency, a frame, a subframe, a resource, a resource block, a region, a band, a subband, a control channel, a data channel, a synchronization signal, various reference signals, various signals, or various messages related to NR may be interpreted in various meanings used in the past or present or to be used in the future.

FIG. 2 is an exemplary diagram illustrating an NR system to which a data transmission method according to one embodiment of the present disclosure can be applied.

NR, a next-generation wireless communication technology under standardization in 3GPP, is a radio access technology capable of providing improved data rates compared to LTE and satisfying various QoS requirements required for each subdivided and detailed usage scenario. In particular, eMBB (enhanced Mobile BroadBand), mMTC (massive MTC), and URLLC (Ultra Reliable and Low Latency Communications) have been defined as representative use scenarios of NR. As a method for satisfying the requirements for each scenario, a frame structure that is more flexible compared to LTE is provided. The frame structure of NR supports a frame structure based on multiple subcarriers. The default subcarrier spacing (SCS) is 15 kHz, and 5 types of SCS, which are $15\ \text{kHz}*2^n$ (n=0, 1, 2, 3, and 4), are supported.

Referring to FIG. 2, a next generation-radio access network (NG-RAN) is configured with gNBs that provide an NG-RA user plane (SDAP/PDCP/RLC/MAC/PHY) and a control plane (RRC) protocol end for a user equipment (UE). In this case, an NG-C indicates a control plane interface used for an NG2 reference point between the NG-RAN and a 5-generation core (5GC). An NG-U indicates a user plane interface used for an NG3 reference point between the NG-RAN and the 5GC.

The gNBs are interconnected through an Xn interface and connected to the 5GC through an NG interface. More specifically, the gNB is connected to an access and mobility management function (AMF) through the NG-C interface and connected to a user plane function (UPF) through an NG-U interface.

In the NR system of FIG. 2, multiple numerologies may be supported. Here, the numerology may be defined by a subcarrier spacing and cyclic prefix (CP) overhead. In this case, multiple subcarrier spacings may be derived by scaling the default subcarrier spacing using an integer. Furthermore, assuming that a very low subcarrier spacing is not used in a very high carrier frequency, a used numerology may be selected independently of a frequency band.

Further, in the NR system, various frame structures according to multiple numerologies may be supported.

<NR Waveform, Numerology, and Frame Structure>

In NR, a CP-OFDM waveform using a cyclic prefix is used for downlink transmission, and CP-OFDM or DFT-s-OFDM is used for uplink transmission. OFDM technology is easy to be combined with MIMO (Multiple Input Multiple Output) and has advantages of using a low-complexity receiver with high frequency efficiency.

Meanwhile, in NR, since requirements for a data rate, a delay rate, coverage, and the like are different for each of the three scenarios described above, it is necessary to efficiently satisfy the requirements for each scenario through a frequency band constituting an arbitrary NR system. To this end, technology for efficiently multiplexing radio resources based on a plurality of different numerologies has been proposed.

Specifically, NR transmission numerology is determined based on a sub-carrier spacing and a cyclic prefix (CP), and exponentially changed using a value 11 as an exponential value of 2 based on 15 kHz as shown in Table 1 below.

TABLE 1

| $\mu$ | Subcarrier spacing (kHz) | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, NR numerologies may be divided into five types according to the subcarrier spacing, which is different from LTE, one of the 4G communication technologies, in which the subcarrier spacing is fixed to 15 kHz. Specifically, in NR, subcarrier spacings used for data transmission are 15, 30, 60, and 120 kHz, and subcarrier spacings used for synchronization signal transmission are 15, 30, 120 and 240 kHz. In addition, an extended CP is applied only to the 60 kHz subcarrier spacing. On the other hand, in the frame structure in NR, a frame, having a length of 10 ms, composed of 10 subframes each having a length of 1 ms is defined. One frame may be divided into half frames of 5 ms, and each half frame includes 5 subframes. In the case of a 15 kHz subcarrier spacing, one subframe is composed of one slot, and each slot includes 14 OFDM symbols.

<NR Physical Resources>

With respect to physical resources in NR, an antenna port, a resource grid, a resource element, a resource block, a bandwidth part, etc. are considered.

An antenna port is defined such that a channel on which a symbol on an antenna port is carried can be inferred from a channel on which another symbol on the same antenna port is carried. When the large-scale property of a channel carrying a symbol on one antenna port can be inferred from a channel carrying a symbol on another antenna port, the two antenna ports may be regarded as being in a QC/QCL (quasi co-located or quasi co-location) relationship. In this case, the large-scale property includes one or more of delay spread, Doppler spread, Doppler shift, average delay, and spatial reception parameter.

FIG. 3 is a diagram for explaining a resource grid supported by the radio access technology to which the present embodiment can be applied.

Referring to FIG. 3, since NR supports a plurality of numerologies on the same carrier, a resource grid may be present according to each numerology. In addition, the resource grid may be present according to an antenna port, a subcarrier spacing, and a transmission direction.

A resource block is composed of 12 subcarriers and is defined only in the frequency domain. In addition, a resource element is composed of one OFDM symbol and one subcarrier. Accordingly, the size of one resource block may vary depending on the subcarrier spacing, as shown in FIG. 3. In addition, in NR, "Point A" serving as a common reference point for a resource block grid, a common resource block, a physical resource block, and the like are defined.

FIG. 4 is a diagram for explaining a bandwidth part supported by the radio access technology to which the present embodiment can be applied.

In NR, unlike LTE in which the carrier bandwidth is fixed to 20 MHz, the maximum carrier bandwidth is set to 50 MHz to 400 MHz for each subcarrier spacing. Therefore, it is not assumed that all UEs use all of these carrier bandwidths. Accordingly, in NR, a bandwidth part (BWP) may be designated within a carrier bandwidth to use a UE as shown in FIG. 4. In addition, the bandwidth part is associated with one numerology and composed of a subset of consecutive common resource blocks, and may be dynamically activated with time. Up to four bandwidth parts are configured for a UE in each of uplink and downlink, and data is transmitted/received using an activated bandwidth part in a given time.

Uplink and downlink bandwidth parts are independently set in the case of a paired spectrum, whereas downlink and uplink bandwidth parts are set in pairs to share a center frequency in order to prevent unnecessary frequency retuning between downlink and uplink operations in the case of an unpaired spectrum.

<NR Initial Access>

In NR, a UE performs cell search and random access procedures to access a base station and perform communication.

The cell search is a procedure in which a UE synchronizes with a cell of a base station using a synchronization signal block (SSB) transmitted by the corresponding base station, obtains a physical layer cell ID, and obtains system information.

FIG. 5 is a diagram illustrating a synchronization signal block in the radio access technology to which the present embodiment can be applied.

Referring to FIG. 5, the SSB is composed of a primary synchronization signal (PSS) and a secondary synchronization signal (SSS) each occupying one symbol and 127 subcarriers, and a PBCH spanning 3 OFDM symbols and 240 subcarriers.

A UE receives the SSB by monitoring the SSB in the time and frequency domains.

The SSB can be transmitted up to 64 times in 5 ms. A plurality of SSBs is transmitted using different transmission beams within 5 ms, and the UE performs detection on the assumption that SSBs are transmitted every 20 ms when viewed based on one specific beam used for transmission. The number of beams that can be used for SSB transmission within 5 ms may increase as the frequency band increases. For example, a maximum of 4 SSB beams can be transmitted at 3 GHz or less, and SSBs can be transmitted using a maximum of 8 different beams in a frequency band of 3 to 6 GHz and using a maximum of 64 different beams in a frequency band of 6 GHz or more.

Two SSBs are included in one slot, and the start symbol and the number of repetitions in the slot are determined according to a subcarrier spacing as described below.

The SSB is not transmitted at the center frequency of a carrier bandwidth, unlike the SS in the conventional LTE. That is, the SSB may be transmitted in a place other than the center of the system band, and a plurality of SSBs may be transmitted in the frequency domain when broadband operation is supported. Accordingly, the UE monitors the SSB using a synchronization raster that is a candidate frequency position for monitoring the SSB. A carrier raster and a synchronization raster, which are center frequency position information of a channel for initial access, are newly defined in NR, and the synchronization raster has a wider frequency interval than the carrier raster and thus can support rapid SSB search of the UE.

The UE may acquire a master information block (MIB) through a PBCH of the SSB. The MIB includes minimum information for the UE to receive remaining minimum system information (RMSI) broadcast by a network. In addition, the PBCH may include information on the position of the first DM-RS symbol in the time domain, information for the UE to monitor SIB1 (e.g., SIB1 numerology information, information related to SIB1 CORESET, search space information, PDCCH related parameter information, etc.), offset information between a common resource block and the SSB (the absolute position of the SSB in a carrier is transmitted through SIB1), and the like. In this case, the SIB1 numerology information is equally applied to some messages used in the random access procedure for the UE to access the base station after the UE completes the cell search procedure. For example, the SIB1 numerology information may be applied to at least one of messages 1 to 4 for the random access procedure.

The aforementioned RMSI may mean system information block 1 (SIB1), and SIB1 is broadcast periodically (e.g., at 160 ms) in the cell. SIB1 includes information necessary for the UE to perform an initial random access procedure and is periodically transmitted through a PDSCH. To receive SIB1, the UE needs to receive numerology information used for SIB1 transmission and control resource set (CORESET) information used for SIB1 scheduling through a PBCH. The UE checks scheduling information for SIB1 using an SI-RNTI in CORESET and acquires SIB1 on the PDSCH according to the scheduling information. SIBs other than SIB1 may be transmitted periodically or may be transmitted according to the request of the UE.

FIG. 6 is a diagram for explaining a random access procedure in the radio access technology to which the present embodiment can be applied.

Referring to FIG. 6, upon completion of cell search, the UE transmits a random access preamble for random access to the base station. The random access preamble is transmitted through a PRACH. Specifically, the random access preamble is transmitted to the base station through a PRACH composed of consecutive radio resources in a specific slot that is periodically repeated. In general, when the UE initially accesses the cell, a contention-based random access procedure is performed, and when random access is performed for beam failure recovery (BFR), a contention-free random access procedure is performed.

The UE receives a random access response to the transmitted random access preamble. The random access response may include a random access preamble identifier (ID), a UL grant (uplink radio resource), a temporary cell-radio network temporary identifier (TC-RNTI), and a time advance command (TAC). Since one random access response may include random access response information for one or more UEs, the random access preamble identifier may be included to indicate a UE for which the included UL grant, TC-RNTI, and TAC are valid. The random access preamble identifier may be an identifier for the random access preamble received by the base station. The TAC may be included as information for the UE to adjust uplink synchronization. The random access response may be indicated by a random access identifier on a PDCCH, that is, a random access-radio network temporary identifier (RA-RNTI).

Upon reception of the valid random access response, the UE processes information included in the random access response and performs scheduled transmission to the base station. For example, the UE applies the TAC and stores the TC-RNTI. In addition, the UE transmits data stored in a buffer of the UE or newly generated data to the base station using the UL grant. In this case, information for identifying the UE needs to be included.

Network Slicing

Network slicing is a new concept applied to 5G mobile communication in which network resources and network functions are provided by rendering end-to-end (E2E) resources from radio access network (RAN) to core network (CN) as one independent slice for each service, and attributes such as network isolation, customization, and independent management and orchestration can be applied to the radio access network and core network of mobile communication.

Communication technology is evolving in a way that constitutes a network slice optimized for each application's characteristics in one huge network in conjunction with the development of technologies such as network function virtualization (NFV), software defined network (SDN), and the like.

The network slice provides a dedicated network specialized for each of various services having different characteristics by creating a logically separated E2E(End-to-End) network including a UE, radio access, transport, and 5G core equipment, through physically one network. That is, the network slice is a technology that provides network resources and network functions required for a service requested by a UE as one independent slice.

FIG. 7 is a diagram for explaining the concept of the network slice according to one embodiment.

Referring to FIG. 7, one network slice is composed of an E2E logical network from a UE and to a counterpart node (a counterpart UE or a counterpart application server). A user can receive a service by accessing a network slice specialized for the used application (eMBB, URLLC, MIoT, V2X, etc.). That is, the UE can simultaneously access one or more network slices. Each slice may be identified by a slice/service type (SST) mapped to an expected network operation in terms of services and characteristics.

A mobile communication service provider may allocate a network resource suitable for a corresponding service for each slice or for each set of specific slices. The network resource may mean a network function (NF) or a logical resource or radio resource allocation provided by the network function (NF). A network slice instance (NSI) may be defined as a set of network function instances and required resources forming a deployed network slice.

In describing the embodiments of the present disclosure, a slice, a service, a network slice, a network service, an application slice, an application service, and the like may be used interchangeably.

Random Access Procedure in Network Slicing

In order to switch from an IDLE (RRC IDLE) state to an ACTIVE (RRC CONNECTED) state in NR, the UE transmits a random access preamble to the network node for a corresponding RACH occasion (RO), and the network node may receive the random access preamble, and then use the random access preamble for synchronization with the UE through TA (timing advance) estimation. The UE transmits random access preambles at different times depending on the delay time difference with the network node, and the network node has various random access preamble formats and random access preamble monitoring periods set according to various scenarios in order to detect a plurality of random access preambles, respectively.

When network slicing is applied, a mobile communication service provider may allocate a network resource suitable for a corresponding service for each slice or for each set of specific slices, and the UE may access one or more slices. To this end, the UE may perform a random access procedure for each independent slice. RAN slices constituting end-to-end (E2E) network slicing may be provided separately through frequency band (e.g., 3.5 GHz, 28 GHz, etc.) and/or time division, and the frequency and time resources allocated for the random access procedure for each slice or the preamble structure may also be different. Here, a method for separately transmitting information on each slice is required.

Transmission of Individual Control Information for RAN Slicing

Along with the issue of network neutrality, the importance of network slicing technology is becoming more prominent.

In order to efficiently support various services in 5G mobile communication, that is, to support multiple services with one system without having separate systems for each of the various services, it is needed to enable dynamic control of resources through slicing. However, RAN slicing has a greater difficulty compared to slicing for the core network. In the RAN slicing concept, it is required to be configured not to affect other slices even in an operation failure state for one slice by enabling each slice to operate like an independent cell, and rendering each slice isolated and operated independently.

To this end, it is important to appropriately slice resources managed by one base station from the upper layer to the physical layer. The upper layers can be implemented for each function, so they can be solved relatively easily in terms of software, but it may be more difficult to slice the lower layers in terms of software. For example, it may be required to implement a modem for communication by using a software defined radio (SDR). Thus, a step-by-step approach can be considered. One embodiment may include a method in which an upper layer is implemented with network function virtualization (NFV) and a lower layer is implemented to perform independent scheduling for each service or each slice.

Under this circumstance, a method of separating and transmitting control information including, for example, system information for each slice is required for RAN slicing In a communication system in which network slicing is not applied, configuration information (e.g., random access parameter and/or resource information, initial bandwidth part (BWP) information, etc.), which is required for a network node to transmit to a UE, can be included and transmitted in the system information (e.g., MIB (Master Information Block), SIB1 (System Information Block 1) message) without considering slices. However, in order to implement RAN slicing, the configuration information or system information needs to be transmitted separately for each slice since characteristics required for types of services or slices are different. For example, information on whether the initial bandwidth part (Initial BWP) needs to be set to a specific BWP for a specific slice or service, or information on random access parameters and/or resource for a specific slice or service, or information on how TDD settings are configured may be transmitted from the network node to the UE.

In transmitting RAN slicing-related information from the network node to the UE, the RAN slicing-related information may be transmitted from the network node to the UE in the form of at least one of, for example, system information, an RRC message, MAC control element (CE), and downlink control information (DCI).

According to one aspect, a unique ID may be assigned for each slice (including, e.g., eMBB, URLLC, V2X slice, etc.), and different services or slices may be distinguished from each other with each slice ID. For example, in transmitting system information allocated for each slice, information may be transmitted based on the slice ID as described above.

Meanwhile, information on RAN slices may be used for handover between slices. In this case, handover between slices may include handover between a plurality of slices provided by the same base station (or cell), handover between slices provided by different base stations (or cells), handover from a base station (or cell) that provides the RAN slices to a base station (or cell) that provides no RAN slice, or handover from a base station (or cell) that provides no RAN slice to a specific slice of a base station (or cell) that provides the RAN slices. For handover between slices, parameters may be predetermined for each slide, and the network node and the UE may know the parameters at the time of handover through transmission of slice-related information from the network node to the UE.

Meanwhile, information related to each slice may be transmitted from the network node to the UE step by step in a plurality of message types. For example, ID information for each slice considering each service type (e.g., eMBB, URLLC, V2X, etc.) may be included in MIB or SIB1, and based on the slice ID assigned to each slice, each UE may be configured to additionally receive only information on one or more required slices.

Meanwhile, according to one aspect, the network node may be configured, for example, so that based on the system information, information on slices available in the corresponding network node is transmitted to UEs, the UE having a desired service or slice among available slices uses the corresponding available slices, and the UE that does not have a desired service or slice or does not support RAN slicing uses a default slice.

System Information Transmission

The network node may transmit at least a part of system information differently for each slice in order to support RAN slicing. The system information may include, for example, MIB or SIB.

According to one aspect, the same MIB may be transmitted for different slices, and a different SIB1 (or RMSI) may be transmitted for each slice. For example, the MIB may include RAN slicing operation information. The RAN slicing operation information may include information on whether the network node transmitting the MIB supports RAN slicing, and may include, for example, 1 to 2 bits. Meanwhile, the MIB may include resource information for acquiring SIB1 for each slice. For example, the MIB may include first resource information for a first slice and second resource information for a second slice. Upon receiving the MIB, the UE may receive SIB1 information about the first slice through the first resource information in response to a determination to use a service corresponding to the first slice based on at least one of the first resource information and the second resource information. Or, upon receiving the MIB, the UE may receive SIB1 information about the second slice through the second resource information in response to a determination to use a service corresponding to the second slice.

According to another aspect, MIB and SIB1 may be configured to be commonly transmitted for different slices. According to one aspect, the MIB may include information on whether RAN slicing is supported, and a UE may be configured to receive different information for each slice in SIB1. For example, each of one or more setting information or parameters included in SIB1 may be configured to have a value for each of a plurality of slices.

According to one aspect, different settings may be defined for the respective slices, and when SIB1 (RMSI) is allocated for each slice, each SIB1 may differently include setting information for each corresponding slice, or different information for each of the plurality of slices may all be included, for example, in a common SIB1 (RMSI). In this case, different information for each slice may include, for example, at least one of the following information.

Information about slice resources, mainly on frequency/time.
Initial BWP, CORESET 0, Search Space
Default SCS for each slice
ServingCellConfigCommonSlB
RACH-related information That is, for example, setting information for each slice (e.g., eMBB, URLLC, V2X, etc.) may include slice resource information on frequency and time, initial BWP for each slice, CORESET 0, Search Space, and default SCS for each slice (subcarrier spacing, for example, set to 60 kHz for URLLC), ServingCellConfigCommonSlB (defined as an RRC message), and RACH-related information (for example, in case of URLLC slices, the RO period may be set relatively short).

The basic concept of RAN slicing may be to divide and operate virtually so that various services can be supported based on one physical network node system. Setting information for slicing network nodes and cores needs to be configured separately, and through this, UEs may have a form implemented so that they can respectively see only the zones or slices to which they belong.

Use of Slice Information During Handover

At least one network node may or may not support RAN slicing. Accordingly, different types of handover procedures may be performed depending on whether to support RAN slicing.

First, there may be a handover procedure between cells which uses RAN slicing. In this case, information on the RAN slice may be included in a handover message. In addition, information related to the RAN slice may be added where necessary among commands exchanged between cells in the handover. By including the information on the RAN slice in the handover message, a UE can be configured to continuously use the slice for the service that the UE has used. For example, a UE that has used the eMBB slice in a first network node may be configured to use the eMBB slice even after performing handover to a second network node.

Meanwhile, handover may be performed from a cell using RAN slicing to a cell that does not use RAN slicing. In this case, information on the RAN slice may be included in the handover message. For example, for a parameter that used separate information about the RAN slice in the previous cell, a kind of default parameter that matches the corresponding parameter may be defined and used.

Meanwhile, handover may be performed from the cell that does not use RAN slicing to the cell that uses RAN slicing. In this case, it can be configured to receive information on the RAN slice to be used in the new cell, and to inform parameters for using an appropriate slice according to the application and QoS used during handover. Alternatively, when performing handover to the new cell, necessary system information may be received so that an appropriate slice can be used.

Handover between cells that do not use RAN slicing may employ a conventional handover procedure.

Control Method for RAN Slicing

According to one aspect, control of RAN slicing is performed through system information, RRC messages, MAC CE (Control Element), or DCI (Downlink Control Information), and may be performed, for example, as follows. First, basic items may be set with system information. In addition, it may be set as an RRC message as needed and activated/deactivated through MAC CE. Meanwhile, contents that change very dynamically may be operated by being included in DCI.

FIG. 8 shows a user equipment and a network node in which one embodiment of the present disclosure is implemented.

Referring to FIG. 8, a user equipment 1100 includes a processor 1110, a memory 1120, and a transceiver 1130. The processor 1110 may be configured to implement the functions, processes and/or methods described herein. Layers of the radio interface protocol may be implemented in the processor 1110.

The memory 1120 is connected to the processor 1110 and stores various information for driving the processor 1110. The transceiver 1130 is connected to the processor 1110, and transmits a radio signal to the network node 1200 or receives a radio signal from the network node 1200.

A network node 1200 includes a processor 1210, a memory 1220, and a transceiver 1230. In the present embodiment, the network node 1200 may be a node of a non-terrestrial network and may include an artificial satellite for performing the radio access procedure according to the present specification. Alternatively, in the present embodiment, the network node 1200 may be a node of a terrestrial network and may include a base station for performing the radio access procedure according to the present specification.

The processor 1210 may be configured to implement the functions, processes and/or methods described herein. Layers of a radio interface protocol may be implemented in the processor 1210. The memory 1220 is connected to the processor 1210 and stores various information for driving the processor 1210. The transceiver 1230 is connected to the processor 1210, and transmits a radio signal to the user equipment 1100 or receives a radio signal from the user equipment 1100.

The processors 1110 and 1210 may include an application-specific integrated circuit (ASIC), other chipsets, logic circuits, and/or a data processing device. The memories 1120 and 1220 may include read-only memory (ROM), random access memory (RAM), flash memory, a memory card, a storage medium, and/or another storage device. The transceivers 1130 and 1230 may include a baseband circuit for processing radio frequency signals. When the embodiment is implemented as software, the above-described technique may be implemented as a module (process, function, etc.) that performs the above-described functions. The module may be stored in the memories 1120 and 1220 and executed by the processors 1110 and 1210. The memories 1120 and 1220 may be provided inside or outside the processors 1110 and 1210 and may be connected to the processors 1110 and 1210 by various well-known means, respectively.

In the above-described exemplary system, although the methods that can be implemented according to the features of the present disclosure described above have been described on the basis of flowcharts. For convenience, the methods have been described as a series of steps or blocks, but the claimed features of the present disclosure are not limited to the order of steps or blocks, and some steps may occur concurrently or in a different order than described above with other steps. Further, those skilled in the art will understand that the steps shown in the flowcharts are not exclusive, and that steps may include additional steps or that one or more steps of the flowcharts may be deleted without affecting the scope of the present disclosure.

What is claimed is:

1. A user equipment (UE) operating in a wireless system supporting slice information, the UE comprising:
a transceiver configured to receive from a network node individual control information which includes parameters having values individually set for slices in a slice set and perform a random access procedure using a resource individually configured for each slice set based on the individual control information; and
a processor configured to control a reception of the individual control information and the random access procedure,
wherein the individual control information is received through a single system information block which is used in common for the slices in the slice set,
wherein the individual control information includes at least one of first control information for a first type slice and second control information for a second type slice, and
wherein the processor is configured to control a random access procedure in the first type slice based on the first control information and to control a random access procedure in the second type slice based on the second control information.

2. The UE of claim 1, wherein each of the first control information and the second control information includes at least one of random access parameter information, random access resource information, initial bandwidth information, time duplex division (TDD) configuration information, slice resource information on frequency, slice resource information on time, Control Channel Resource Set 0 (CORESET 0), search space, default subcarrier spacing (SCS) per slice, bandwidth part (BWP), system information blocks (SIBs) configuring a service cell, and random access channel (RACH) information.

3. The UE of claim 1, wherein the single system information block further includes an information value indicating whether the network node supports a slice operation.

4. The UE of claim 1, wherein the first control information and the second control information are configured so that their components are different from each other or at least one of values of their components is different from each other.

5. The UE of claim 1, wherein the individual control information further includes identification information for each slice, and
wherein the processor is configured to extract the first control information based on a first identification code corresponding to the first type slice, and to extract the second control information based on a second identification code corresponding to the second type slice.

6. The UE of claim 1, wherein the individual control information includes reception control information for controlling reception of at least one of the first control information and the second control information, and
wherein the processor is configured to control reception of at least one of the first control information and the second control information based on the reception control information.

7. The UE of claim 6, wherein the reception control information includes first reception control information corresponding to the first type slice and second reception control information corresponding to the second type slice.

8. The UE of claim 6, wherein the reception control information includes at least one of information on a location of a first demodulation reference signal (DM-RS) symbol in a frequency or spatial domain, SIB1 numerology information, CORESET-related information for scheduling SIB1, search space information, and parameter information related to a PDCCH (Physical Downlink Control Channel).

9. The UE of claim 1, wherein the processor is configured to control a communication based on default control information and a default configuration resource, when the first control information cannot be used even if it is intended to control a communication in the first type slice, or when the second control information cannot be used even if it is intended to control a communication in the second type slice.

10. A network node operating in a wireless system supporting slice information, the network node comprising:
a transceiver configured to transmit to a user equipment (UE) individual control information which includes parameters having values individually set for slices in a slice set and perform a random access procedure using a resource individually configured for each slice set based on the individual control information; and
a processor configured to control a transmission/reception of the individual control information and the random access procedure,
wherein the individual control information is transmitted through a single system information block which is used in common for the slices in the slice set,
wherein the individual control information includes at least one of first control information for a first type slice and second control information for a second type slice, and
wherein the processor is configured to control a random access procedure in the first type slice based on the first control information and to control a random access procedure in the second type slice based on the second control information.

11. The network node of claim 10, wherein each of the first control information and the second control information includes at least one of random access parameter information, random access resource information, initial bandwidth information, time duplex division (TDD) configuration information, slice resource information on frequency, slice resource information on time, Control Channel Resource Set 0 (CORESET 0), search space, default subcarrier spacing (SCS) per slice, bandwidth part (BWP), system information blocks (SIBs) configuring a service cell, and random access channel (RACH) information.

12. The network node of claim 10, wherein the first control information and the second control information are configured so that their components are different from each other or at least one of values of their components is different from each other.

13. The network node of claim 10, wherein the individual control information further includes identification information for each slice, and
wherein the processor is configured to include the first control information in the individual control information based on a first identification code corresponding to the first type slice, and to include the second control information in the individual control information based on a second identification code corresponding to the second type slice.

14. The network node of claim 10, wherein the individual control information includes reception control information for controlling reception of at least one of the first control information and the second control information.

15. The network node of claim 14, wherein the reception control information includes first reception control information corresponding to the first type slice and second reception control information corresponding to the second type slice.

16. The network node of claim 14, wherein the reception control information includes at least one of information on a location of a first demodulation reference signal (DM-RS) symbol in a frequency or spatial domain, SIB1 numerology information, CORESET-related information for scheduling SIB1, search space information, and parameter information related to a PDCCH (Physical Downlink Control Channel).

17. The network node of claim 10, wherein the processor generates a handover message to be transmitted to the UE when the UE needs to be handed over to another network node,
wherein the processor includes at least one of first handover information for the first type slice and second handover information for the second type slice in the handover message when the another network node supports a slice-based communication,
wherein the processor includes default handover information for the another network node in the handover message when the another network node does not support the slice-based communication, and
wherein the transceiver is configured to transmit the handover message to the UE.

18. A method of performing a communication by a user equipment (UE) in a communication system supporting slice information, the method comprising:
receiving from a network node individual control information which includes parameters having values to individually set for slices in a slice set; and
performing a random access procedure using a resource individually configured for each slice set based on the individual control information;
wherein the individual control information is received through a single system information block which is used in common for the slices in the slice set,
wherein the individual control information includes at least one of first control information for a first type slice and second control information for a second type slice, and
wherein a random access procedure in the first type slice is controlled based on the first
control information and a random access procedure in the second type slice is controlled based on the second control information.

19. The method of claim 18, wherein the single system information block further includes an information value indicating whether the network node supports a slice operation.

20. The method of claim 18, wherein the first control information and the second control information are configured so that their components are different from each other or at least one of values of their components is different from each other.

* * * * *